United States Patent [19]

Das et al.

[11] Patent Number: 4,476,286

[45] Date of Patent: Oct. 9, 1984

[54] THERMOSETTING CATIONIC LATEX COMPOSITIONS CONTAINING AMINOPLAST CURING AGENTS

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 529,074

[22] Filed: Sep. 2, 1983

Related U.S. Application Data

[63] Continuation of Ser. No. 305,565, Sep. 25, 1981, abandoned.

[51] Int. Cl.$^3$ .................... C08L 61/28; C08L 33/12
[52] U.S. Cl. .................................... 525/162; 524/512
[58] Field of Search ................ 525/162, 163; 524/512, 524/555, 901

[56] References Cited

U.S. PATENT DOCUMENTS

| | | | |
|---|---|---|---|
| 3,108,979 | 10/1963 | Le Fevre et al. | 260/29.6 |
| 3,399,159 | 8/1968 | Samour | 260/29.6 |
| 3,532,658 | 10/1970 | Gintz | 260/29.6 |
| 3,547,950 | 12/1970 | Gander | 260/33.2 |
| 3,799,902 | 3/1974 | Anderson | 260/29.6 NR |
| 3,817,896 | 6/1974 | Bergmeister et al. | 260/29.6 R |
| 3,830,769 | 8/1974 | Ray-Chaudhuri et al. | 260/29.6 R |
| 3,892,703 | 7/1975 | Burke, Jr. | 260/29.6 R |
| 3,897,381 | 7/1975 | Tugukuni et al. | 260/29.2 TN |
| 3,901,857 | 8/1975 | Sackman et al. | 260/79.3 M |
| 3,941,727 | 3/1976 | Timmerman et al. | 260/8 |
| 4,001,159 | 1/1977 | Imai et al. | 260/29.6 TA |
| 4,008,247 | 2/1977 | Tucker | 260/308 B |
| 4,012,353 | 3/1977 | Chasin et al. | 260/29.6 NR |
| 4,064,091 | 12/1977 | Samour et al. | 260/29.6 HN |
| 4,108,817 | 8/1978 | Lochel, Jr. | 260/29.6 E |
| 4,130,523 | 12/1978 | Hoy et al. | 260/29.6 R |
| 4,132,686 | 1/1979 | Toyoshima et al. | 260/21 |
| 4,138,446 | 2/1979 | Kawakami et al. | 260/875 |
| 4,151,148 | 4/1979 | Chasin et al. | 260/29.6 NR |
| 4,164,489 | 8/1979 | Daniels et al. | 260/29.6 R |
| 4,178,400 | 12/1979 | Lochel, Jr. | 427/435 |
| 4,180,519 | 12/1979 | Neel et al. | 260/459 A |
| 4,195,147 | 3/1980 | Sekmakas et al. | 526/312 |
| 4,207,405 | 6/1980 | Masler et al. | 525/328 |
| 4,224,415 | 9/1980 | Meitzner et al. | 521/38 |
| 4,265,795 | 5/1981 | Sekmakas et al. | 260/29.6 NR |
| 4,318,956 | 3/1982 | Stevens et al. | 524/812 X |

*Primary Examiner*—Theodore E. Pertilla
*Attorney, Agent, or Firm*—Godfried R. Akorli

[57] ABSTRACT

Thermosetting cationic acrylic latex compositions which comprise active hydrogen group-containing cationic latices are herein diclosed. The coating compositions which comprise the cationic latices which are free of a carboxyl or carboxylate group are formulated with aminoplast curing agent.

4 Claims, No Drawings

THERMOSETTING CATIONIC LATEX COMPOSITIONS CONTAINING AMINOPLAST CURING AGENTS

This is a continuation of application Ser. No. 305,565, filed Sept. 25, 1981, now abandoned.

BACKGROUND OF THE INVENTION

1. Field of the Invention

The present invention relates to thermosetting cationic latices, coating compositions prepared therefrom and the process for preparing the same.

2. Brief Description of the Prior Art

Cationic latices are known in the art and their method of preparation involving free radical emulsion polymerization of monomers in water, in the presence of cationic surfactants, is also known. The free radical emulsion polymerization procedure generally results in high molecular weight polymeric products which are normally in the range of 100,000 to several million. In this molecular weight range, the latices possess good mechanical properties. It has, however, been found that the latices leave something to be desired as to film properties relating to protective durability, i.e., the ability of coatings to maintain their integrity against chemicals, weathering, and the like.

In areas such as paper and textile manufacture where protective durability is not an essential service condition, cationic latices in their thermoplastic form have found a ready application primarily due to their inherent adhesion to anionic substrates. In areas such as protective coatings manufacture, where protective durability, particularly outdoor durability, is an essential service condition, the cationic latices in their thermoplastic form are less desirable. In order to prepare good coatings, particularly protective coatings, with properties of outdoor durability, it is desirable to use thermosetting compositions. Coating compositions comprising thermosetting latices are, moreover, advantaged in that their application avoids problems such as air pollution, fire hazards and other problems which attend solvent-based coating compositions. The art-known thermosetting latices of commercial significance are, however, basically anionic, and not cationic.

In developing the present invention, it has been found that there are a number of attendant problems that might have hindered the development of cationic thermosetting latices of commercial significance, particularly for coating applications.

There is now provided by this invention, a thermosetting cationic latex, which is particularly useful in preparing thermosetting coating compositions.

SUMMARY OF THE INVENTION

In accordance with the foregoing, the present invention encompasses a thermosetting cationic acrylic latex composition comprising a cationic acrylic latex and an aminoplast as a curing agent, the cationic latex comprises a copolymer of:
(a) an active hydrogen group-containing ethylenically unsaturated monomer, and
(b) one or more other ethylenically unsaturated monomers; the monomers of (a) and (b) are free of a carboxyl or carboxylate group.

The articles coated with the instant compositions, particularly the coating composition thereof, and the process for preparing same are also encompassed by this invention.

Thermosetting coating compositions of this invention have been found to have good substrate adhesion; more significantly, they cure very effectively to provide durable coatings. The cured films have been found to be very desirable, in that they display excellent properties of adhesion, smoothness, gloss retention, non-chalking, chemical and solvent resistance.

In a preferred embodiment, thermosetting coating compositions contain amino groups. The amino group-containing compositions have been found to display, in addition to the above, properties of mildew resistance and oxidative stability. The characterization of the coating compositions as "amino group-containing" is used herein to denote that the polymer contains an amino group either as an integral part of it, or as otherwise present in its matrix. The former is illustrated by copolymerization of amino group-containing monomers, as is preferred herein, and the latter by, say, the use of an amino group-containing reagent, such as a surfactant.

DETAILED DESCRIPTION OF THE INVENTION

The cationic acrylic latex of this invention is thermosetting and is prepared by free radical polymerization in an aqueous medium of ethylenically unsaturated monomers in the presence of a cationic surfactant. The present invention is further characterized in that the acrylic latex polymer is free of a carboxyl or carboxylate group.

The polymerizable monomers are selected from the group consisting of an active hydrogen group-containing monomer and one or more other monomers different from the above, all of which are free of carboxyl groups.

The active hydrogen group can be a hydroxyl, amino, amido or thiol group or mixtures thereof. They can be incorporated into the polymer, during the preparation thereof, by copolymerizing ethylenically unsaturated monomers containing said active hydrogen groups.

Representative of the active hydrogen group-containing monomers are the hydroxyl group-containing monomers such as hydroxyalkyl acrylates and methacrylates. Preferably, the hydroxyalkyl group contains from about 2 to 4 carbon atoms. Examples thereof are hydroxyethyl acrylate, hydroxyethyl methacrylate, hydroxypropyl acrylate and hydroxypropyl methacrylate. The hydroxyl group-containing monomers are preferred herein.

Examples of the amino group-containing monomer are the same as described hereinafter.

Examples of vinyl monomers containing amido groups are acrylamide, methacrylamide, ethacrylamide, alpha-chloro acrylamide, vinyl acetamide, N-methyl acrylamide, N-ethyl acrylamide and N-methyl methacrylamide.

The vinyl monomers containing the active hydrogens can be used in amounts of 1 to 30, preferably 1 to 10 percent by weight based on total weight of the monomer charge.

Examples of other ethylenically unsaturated monomers which are generally copolymerized with the above monomers are esters of unsaturated organic acids. These monomers can constitute from about 30 to 90, preferably from 40 to 80 percent of the total monomer charge. Representative of said monomers are alkyl acrylates and methacrylates containing from about 1 to 18 carbon atoms in the alkyl group.

The cationic latex can contain a hard polymer segment derived from an alkyl methacrylate containing from 1 to 3 carbon atoms in the alkyl group such as methyl methacrylate and ethyl methacrylate. Also, the cationic latex can contain a soft polymer segment obtained from the use of an alkyl methacrylate containing from 4 to 12 carbon atoms in the alkyl group, for example, butyl methacrylate and hexyl methacrylate, or an alkyl acrylate containing from 1 to 8 carbon atoms in the alkyl group, for example, butyl acrylate and 2-ethylhexyl acrylate. Mixtures of alkyl methacrylates containing from 4 to 12 carbon atoms in the alkyl group and alkyl acrylates containing from 1 to 8 carbon atoms in the alkyl group can also be used.

Another type of ethylenically unsaturated monomer which can be used in preparing the cationic latex constitutes copolymerizable monomeric materials such as styrene, alpha-methyl styrene, alpha-chlorostyrene, allyl chloride and acrylonitrile. This type of unsaturated monomeric materials can constitute about 0 to 60, preferably 0 to 40 percent by weight based on the total weight of the monomer charge.

Amino group-containing monomers are particularly useful in the preparation of the preferred embodiment of the invention, with the advantages set forth above. The amino group can be primary, secondary, tertiary or quaternary. Representative of the amino group-containing monomers are aminoalkyl acrylates or methacrylates. Preferably, the aminoalkyl group contains from about 1 to 6 carbon atoms in the alkyl radical. Examples thereof are appropriate salts of aminoethyl, aminopropyl and aminohexyl acrylates or methacrylates, N,N-dialkylaminoalkyl acrylates or methacrylates. Also useful are vinyl monocyclic or bicyclic amino compounds including those which have a five or six-membered heterocyclic compound with a nitrogen heteroatom; acrylamide-amino modified monomers and quaternary ammonium group-containing monomers.

The amino group-containing monomers are present for the polymerization in amounts, preferably, from about 0.5 to 10, more preferably from about 1 to 3, and most preferably from about 1.5 to 2.5 percent based on total weight of the monomer charge.

The preparation of the instant cationic latices involves the use of cationic surfactants. The surfactants are typically salts of long chain amines. The amines can be either primary, secondary, tertiary or quaternary. The gegen-ion can be $F^-$, $Cl^-$, $I^-$, $Br^-$, $CH_3SO_3^-$, $(CH_3)_2SO_4^-$, $CH_3SO_4^-$, and the like. Preferred gegen-ions are those derived from acids selected from the group consisting of phosphoric acid, phosphorous acid, hypophosphorous acid, and alkyl or aryl hydrogen phosphate such as described in U.S. Application Ser. No. 305,585, issued Apr. 19, 1983 as U.S. Pat. No. 4,380,601. Filed even date herewith, and which is hereby incorporated by reference. Other preferred gegen-ions are those derived from certain aromatic or aliphatic sulfonic acids such as described in U.S. Application Ser. No. 305,590, issued Aug. 16, 1983 as U.S. Pat. No. 4,399,254. Filed even date herewith, and which is hereby incorporated by reference.

The surfactants can be of an external or internal type, or both. By external surfactants are meant those which do not constitute an integral part of the resulting acrylic latex polymer backbone. In contrast, by internal surfactants are meant those which do constitute an integral part of the resulting latex polymer backbone; they are realized through a copolymerization of monomers which are capable of salt formation. It is desired to point out that when the internal surfactants are employed, the salt formation can occur before, during or after polymerization of the monomer. The gegen-ion of the internal salt can be the same as described above.

Typically, the amount of external surfactant required varies primarily with the concentration of the monomers to be handled and, to an extent, with the choice of emulsifier, monomers, and proportions of the monomers. Usually, the amount of external surfactant is between 0 to 10 percent by weight of the mixture of monomers and is preferably 0.1 to 5 percent by weight. If the latex polymer is to contain none or relatively low amounts of the external surfactant, the amount of the polymerizable monomer giving rise to the internal surfactant will have to be increased compensatorily.

The free radical polymerization initiator is a water-soluble type. Examples include peroxides such as hydrogen peroxide and ionic types such as ammonium, sodium and potassium peroxydisulfate, and redox catalysts which are preferred. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomer mixture.

The cationic latex can be prepared by emulsion polymerization techniques well known in the art. Examples of suitable techniques involve the pre-emulsification technique and the seeding technique. In the pre-emulsification technique, a small amount of water is present in the polymerization vessel together with a polymerization initiator and optionally all or part of the surfactant emulsifying agent. The monomer charge is emulsified in a larger amount of water and is continuously added to the reaction vessel under polymerizing conditions. Alternately, the total amount of water may be present in the reaction vessel and the monomer or monomers added in bulk form. If all the surfactant is not present initially in the reaction vessel, it can be added simultaneously with the monomer addition.

In the seeding technique, a small amount of the monomer charge is added to the reaction vessel along with all or part of the polymerization initiator and all or part of the surfactant and polymerized to form a seed latex. After formation of the seed latex, the remaining polymerization ingredients are added in a continuous manner to the reaction vessel under polymerizing conditions to form the final polymer emulsion.

Generally, the solids content of the cationic latex prepared by the above method will be from about 35 to 65 percent and usually within the range of about 40 to 60 percent. The molecular weight of the latex is in the range of about 100,000 to 10 million on a weight average basis, as determined by gel permeation chromatography. Preferably the molecular weight is about 250,000 or higher.

The latex of the present invention can contain small amounts, for example, up to 15 percent by weight based on total solvent weight, including water, of an organic solvent. The organic solvent can be added to the acrylic latex either during or after the emulsion polymerization, preferably after the polymerization. These solvents should be selected such that they will not adversely affect rheological qualities or drying rates of the applied films or film continuity. Hydrocarbon solvents can be used, although stable (not reactive) ester, ketone, ether-ester and other types of water-miscible solvents can be used.

The cationic latex prepared by the process described above can be mixed with a minor amount, that is, up to 20 percent by weight based on total latex weight, of thickening agents, stabilizers, anti-foaming agents, preservatives, pigments, pigment extenders and plasticizers, if desired.

As stated herein, the latices of this invention are free of a carboxyl or carboxylate group.

The cationic latex of the present invention is made thermosetting in nature by the presence of aminoplast curing agents. The curing agents can be an integral part of the polymer or they can be external to the polymer.

Curing agents which are integral with the acrylic polymer are described in U.S. Pat. No. 4,166,882, column 3, line 37, to column 4, line 2, incorporated herein by reference, which discloses curing agents which are an integral part of an acrylic polymer which are prepared by including within the monomer charge polymerizable ethylenically unsaturated monomers containing a self-curing group such as N-methylol ether derivatives of acrylic and methacrylic amides. External curing agents can also be used. These curing agents can be aminoplasts as disclosed in U.S. Pat. No. 4,166,882, column 4, line 50, to column 5, line 28, incorporated herein by reference. The aminoplasts preferred herein are acidulated melamines such as CYMEL 1141 available from American Cyanamid Company.

The thermosetting compositions prepared as described above can be employed in coating compositions. The thermosetting cationic latex prepared as described above can be employed in paint compositions. Pigments which may be used can be any of the conventional types with the proviso that they do not affect the desirable properties of the paint; the settling property of the paint, for example, would have to be taken into account.

The pigment content of the paint is usually expressed as the pigment-to-binder weight ratio. In the practice of the present invention, the pigment-to-binder weight ratios are as high as 2:1, for most pigmented coatings, are within the range of 0.5 to 1:1.

The cationic latex of the present invention, including pigmented latex, is stable, that is, it is non-sedimenting when stored at 10° to 30° C. If any sediment does form, it is the type which can be redispersed with mild agitation.

Coating compositions as described above are particularly useful for coil coating applications. Coil coating involves the application of the coating composition to a continuous strip of a metallic substrate, usually aluminum or steel. The metal is of relatively light gauge and comes to the coating operation in the form of coils from which it is unwound and continuously coated. After coating, the coil passes into a baking or curing oven where it is cured at high temperatures for a short period of time. The coated article is then passed to further operations where it is fabricated into desirable shapes such as for home and industrial siding as well as automotive and appliance parts.

Although particularly useful in coil coating applications, the thermosetting compositions of the cationic latex can be applied to any solid substrate such as glass, porcelain or metals other than steel and aluminum such as copper, brass, and nickel.

Having generally described the features of this invention, the following examples are given to illustrate more fully to those skilled in the art, the practice of this invention without intending any limitations thereby. All parts and percentages are by weight unless otherwise indicated.

EXAMPLES

EXAMPLE 1

The following example shows the preparation of the acrylic latex of this invention. The following were used in the preparation:

| Ingredients | Parts by Weight | |
|---|---|---|
| Reactor Charge | | |
| Deionized water | 616.2 | |
| Mix A | 109.3 | |
| Feed D | 120.8 | |
| Ferric chloride (1.0% aqueous) | 0.3 | grams |
| Feed A | | |
| 10% Feed C | 60 | |
| Feed B | | |
| Hydrogen peroxide solution (30% aqueous) | 5.4 | |
| Feed C | | |
| Butyl acrylate | 282 | |
| Methyl methacrylate | 294 | |
| Hydroxypropyl acrylate | 24 | |
| Feed D | | |
| Dimethylaminoethyl methacrylate | 7.5 | |
| Methanesulfonic acid (70% aqueous) | 6.55 | |
| Deionized water | 106.8 | |
| Mix A (10% Aqueous) | | |
| Lauryl amine | 4.0 | |
| Deionized water | 114.5 | |
| Methanesulfonic acid (70% aqueous) | 3.0 | |

The reactor charge was heated and agitated under a nitrogen atmosphere to about 56° C., followed by the addition of Feed A. The temperature of the reaction mixture was allowed to rise to 70° C. and then held for 15 minutes at this temperature. The reaction mixture was then heated to 71° C. Feed B was then added and the addition of Feed C was commenced and continued at the rate of 37.5 ml. per 15 minutes. About 3 minutes from the commencement of the addition of Feed C, the reaction mixture attained a temperature of 76° C., with its color changing to blue indicating the initiation of polymerization. About an hour after the commencement of the addition of Feed C, Feed D was added in three equal portions, at one hour intervals, with the temperature maintained at 72° C. With the completion of the addition of Feed C and Feed D, the reaction mixture was held for one hour at a temperature of 77° C. Thereafter, the mixture was cooled, and then filtered. Resulting was an acrylic latex having a pH of 2.9, total resin solids content of 40.1 percent and a Brookfield viscosity of 44.5 measured with a No. 2 spindle at 20 rpm, measured at 22° C. The particle size of the latex was 890 Angstroms.

EXAMPLE 2

This example shows, also, the preparation of the acrylic latex of this invention. The following were used in the preparation:

| Ingredients | Reactor Charge |
|---|---|
| | Parts by Weight |
| Deionized water | 898.3 |

-continued

| | |
|---|---|
| Feed X | 7.0 |
| Feed D | 110.0 |
| Ferric chloride (1.0% aqueous) | 5.6 parts per million |
| Feed A | 69.9 |

Feed A

| Ingredient | Parts by Weight |
|---|---|
| 10% Feed C | 69.9 |

Feed B

| Ingredient | Parts by Weight |
|---|---|
| Hydrogen peroxide solution (30% aqueous) | 5.4 |

Feed C

| Ingredients | Parts by Weight |
|---|---|
| Butyl acrylate | 328.5 |
| Methyl methacrylate | 342.5 |
| Hydroxypropyl acrylate | 28.0 |

Feed D

| Ingredients | Parts by Weight |
|---|---|
| Dimethylaminoethyl methacrylate | 16.9 |
| HCl (37% aqueous) | 10.5 |
| Deionized water | 192.6 |

Feed X

| Ingredients | Parts by Weight |
|---|---|
| Lauryl amine | 5.0 |
| Deionized water | 50.6 |
| HCl (37% aqueous) | 2.6 |

The reactor charge was heated and agitated under a nitrogen atmosphere to about 70° C. and held for 15 minutes at this temperature. At 73° C., Feed B was added and the addition of Feed C was commenced and continued over four hours, at a constant rate. About 10 minutes from the commencement of the addition of Feed C, the reaction mixture attained a blue color, indicating the initiation of polymerization. About an hour after the commencement of the addition of Feed C, Feed D was added in three equal portions, at one hour intervals, with the temperature maintained over the range of 73°–75° C. With the completion of the addition of Feed C and Feed D, the reaction mixture was held for one hour at a temperature of 73° C. Thereafter, the mixture was cooled, and then filtered. Resulting was an acrylic latex having a pH of 2.4, total resin solids content of 40 percent and a Brookfield viscosity of 24 centipoises measured with a No. 2 spindle at 50 rpm, measured at 22° C. The particle size of the latex was 1662 Angstroms.

EXAMPLE 3

This example illustrates the instant thermosetting coating composition comprising the latices of this invention.

A pigment paste was prepared with the following:

| Ingredients | Parts by Weight (grams) |
|---|---|
| Acrylic cationic grind vehicle[1] | 60 |
| Diethylene glycol monobutylether | 40.0 |
| Lactic acid (88% aqueous) | 9.5 |
| Deionized water | 97.2 |

-continued

| Ingredients | Parts by Weight (grams) |
|---|---|
| DREWMULSE[2] | 6.17 |
| Titanium dioxide | 380.0 |

[1]This comprises an amine-containing, water-reducible acrylic polymer.
[2]A defoamer, available from Drew Company.

The above ingredients were ground in a Cowles mixer to a Hegman No. 7.5 grind.

The paint was prepared using the above paste and the following ingredients, as listed below:

| Ingredients | Parts by Weight (grams) |
|---|---|
| Pigment paste (from above) | 62.41 |
| CYMEL 1141[3] | 5.88 |
| Latex of Example 2 | 101.90 |
| Diethylene glycol monobutylether | 8.51 |
| Deionized water | 5.0 |

[3]Melamine-type curing agent available from American Cyanamid Company.

To obtain the paint, the above ingredients were thoroughly mixed under agitation; the latex, the diethylene glycol monobutylether and deionized water were introduced as a mix.

The above paint was applied on panels of primed aluminum substrate (Alcoa Bonderite 721) by a drawdown method and baked at a temperature of 420° F. (216° C.) for 42 seconds. The oven temperature was 500° F. (260° C.). The panels were quenched in deionized water after baking. There were obtained films of 0.7 mils thickness, having excellent substrate adhesion, smoothness, gloss, water resistivity, chemical and solvent resistance and exterior durability.

We claim:

1. In an improved stable thermosetting coating composition for preparing a decorative or protective coating which is solvent-resistant and weather-durable; said coating composition contains a cationic acrylic latex and a curing agent; the cationic acrylic latex comprises a copolymer of:
   (a) an active hydrogen-containing ethylenically unsaturated monomer, and
   (b) one or more other ethylenically unsaturated monomers; the improvement comprising from about 0.5 to 10 percent amino group-containing monomer which is the same or different from (b), the improvement further comprising the cationic acrylic latex which is free of carboxyl or carboxylate groups and the curing agent which is an acidulated melamine.

2. A coating composition as recited in claim 1, wherein the acrylic latex contains hydroxyl groups which are derived from a copolymerizable ethylenically unsaturated monomer containing a hydroxyl group.

3. A coating composition as recited in claim 1, wherein the copolymerizable amino group-containing monomer is in an amount from about 1 to 3 percent.

4. A coating composition as recited in claim 3, wherein the copolymerizable amino group-containing monomer is in an amount from about 1.5 to 2.5 percent.

* * * * *